(No Model.)
G. M. CHASE, Jr.
WAGON WHEEL.
No. 246,459. Patented Aug. 30, 1881.
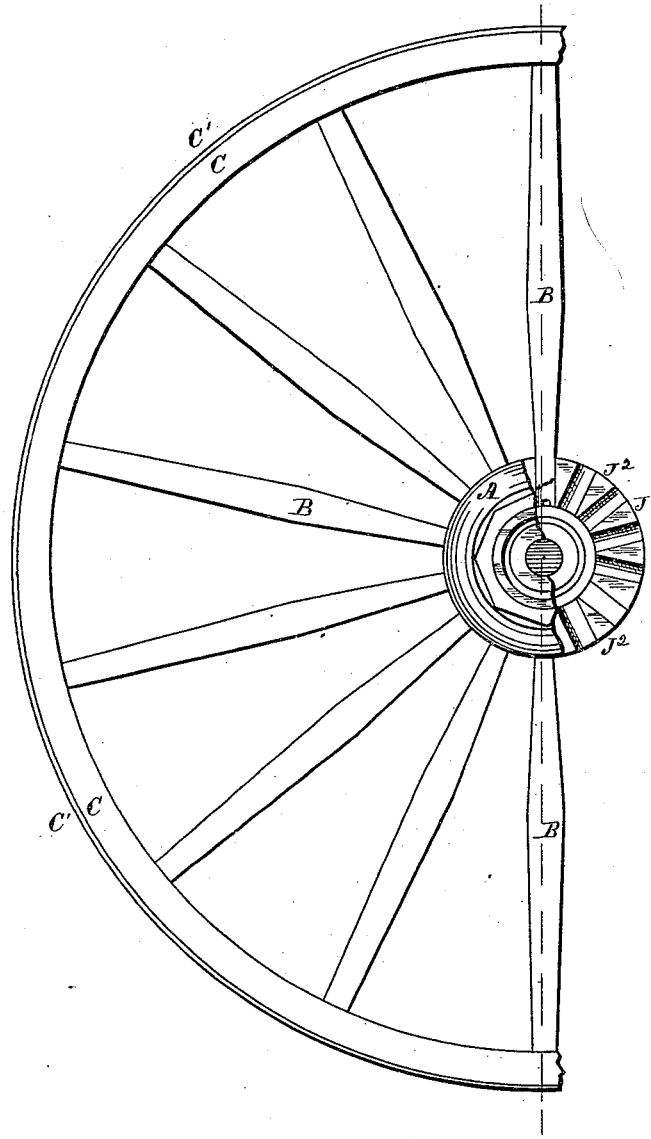
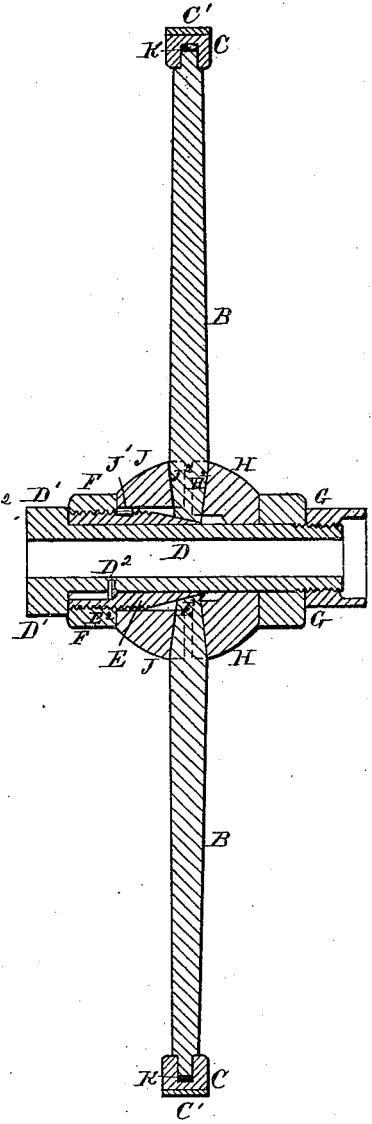
Witnesses.
C. L. Burdett.
Edwin T. Dimock.
Inventor
George M. Chase Jr.
by Theo. G. Ellis, Attorney

UNITED STATES PATENT OFFICE.

GEORGE M. CHASE, JR., OF NEW BRITAIN, CONNECTICUT, ASSIGNOR TO HIMSELF, HARLEY P. CHASE, OF MYSTIC, AND HENRY E. CHASE, OF NEW BRITAIN, CONNECTICUT.

WAGON-WHEEL.

SPECIFICATION forming part of Letters Patent No. 246,459, dated August 30, 1881.

Application filed July 21, 1881. (No model.)

*To all whom it may concern:*

Be it known that I, GEORGE M. CHASE, Jr., of New Britain, in the county of Hartford and State of Connecticut, have invented certain new and useful Improvements in Wagon-Wheels; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to wagon and carriage wheels, and its object is to provide an arrangement within the hub by which the spokes can be forced outward, so as to tighten the tire when required, and also to provide a better construction of the parts where the outer ends of the spokes enter the felly, to avoid the battering of the shoulder of the spoke, as is now commonly the case.

In the accompanying drawings, illustrating my invention, Figure 1 is a front view of one-half of a wheel having my improvements, with one-half of the hub shown in section. Fig. 2 shows a vertical cross-section of the wheel through the axis of the hub.

A is the hub, B B are the spokes, and C is the felly, of a wheel having my improvements. C' is the metallic tire of the wheel.

D is the box of the hub, which fits upon the axle in the customary manner.

E is a sliding sleeve, fitting upon the exterior of the box D, which is turned of a cylindrical form to receive it. This sleeve has its forward end, or the part coming directly under the inner ends of the spokes, made of a conical form, so that as the sleeve is drawn forward or back the spokes are moved farther out or in in a radial direction. This is shown at E' in the drawings. The rear end of the sleeve is furnished with a screw-thread, E², upon which turns the nut F. This nut bears against the head D' of the box D, and serves to move the sleeve and hold it in position.

G is a nut on the forward or outer end of the axle-box D. Its purpose is to serve as a clamp to hold all the parts of the hub securely together.

H and J are two plates, forming the body of the hub, between which the spokes are clipped and held by the pressure of the nut G. This nut forces the two plates and the nut F against the head D', so that the box D serves as a bolt passing through the hub to secure all the parts together. There is a spline and feather, J', between the parts J and E and a spline and feather, D², between the parts E and D. These permit the said parts to move longitudinally upon each other, but not to turn, so that when the nut F is turned, which lies between the head D' and the plate J, it moves the sleeve E back or forward, as may be desired. In order to force out the spokes so as to tighten the tire, the nut G is first slightly loosened, and then the nut F is turned so as to force the cone of the sleeve E farther forward or under the ends of the spokes. This wedges them outward, and when far enough out the nut G is again tightened, which secures the whole hub firmly together. The plates J and H are provided on their faces with projections J² and H², which leave recesses between them for the reception of the inner ends of the spokes. The sides of the spokes are intended to be parallel, so that they can move out without loosening, while the edges at the front and back of the wheel are intended to be inclined or tapered. This is to assist in bearing the end-thrust, so that it will not come entirely upon the cone at the middle. When the spokes are set at the right distance out they are firmly clamped by screwing up the nut G, which will close up the opening at the edges whatever may be the position of the spokes.

K is a rubber packing or cushion inserted between the end of the tenon on the spoke and the mortise in the felly. With the ordinary construction the shoulders which rest upon the inner surface of the felly become battered and bruised, and are the weakest point in the common construction.

My improved packing is intended to be of such a thickness and hardness that the end of the spoke will compress it so that it will receive part of the pressure and relieve the shoulders each side of the tenon. This I am enabled to do by the use of an elastic and somewhat compressible material. An unyielding substance in the mortise would have the same effect as to rest the tenon in the bottom of the hole, which it has been proven by experience will not answer.

What I claim as my invention is—

1. The combination of the box D, the sleeve E, the nut F, the nut G, and the plates J H, to form a wheel-hub, substantially as described.

2. In a wheel-hub, the conical sleeve E and nut F, turning in a thread on said sleeve and held from moving longitudinally, whereby the spokes are pressed outward, substantially as described.

GEORGE M. CHASE, Jr.

Witnesses:
A. P. COLLINS,
FRED M. GOODRICH.